(12) United States Patent
Wang et al.

(10) Patent No.: US 11,686,870 B2
(45) Date of Patent: Jun. 27, 2023

(54) INTERPRETIVE-GUIDED VELOCITY MODELING SEISMIC IMAGING METHOD AND SYSTEM, MEDIUM AND DEVICE

(71) Applicant: CHINA UNIVERSITY OF PETROLEUM (East China), Qingdao (CN)

(72) Inventors: Zhiwei Wang, Qingdao (CN); Liyun Fu, Qingdao (CN); Shikai Jian, Qingdao (CN); Wubing Deng, Qingdao (CN); Qingqing Li, Qingdao (CN)

(73) Assignee: CHINA UNIVERSITY OF PETROLEUM (East China), Qingdao (CN)

( * ) Notice: Subject to any disclaimer, the term of this patent is extended or adjusted under 35 U.S.C. 154(b) by 0 days.

(21) Appl. No.: 17/942,110

(22) Filed: Sep. 9, 2022

(65) Prior Publication Data
US 2023/0095632 A1 Mar. 30, 2023

(30) Foreign Application Priority Data
Sep. 29, 2021 (CN) .......................... 202111149794.4

(51) Int. Cl.
G01V 1/30 (2006.01)
G01V 1/28 (2006.01)
G01V 1/34 (2006.01)

(52) U.S. Cl.
CPC .............. *G01V 1/303* (2013.01); *G01V 1/282* (2013.01); *G01V 1/345* (2013.01); *G01V 2210/6222* (2013.01)

(58) Field of Classification Search
CPC ........ G01V 1/303; G01V 1/282; G01V 1/345; G01V 2210/6222
See application file for complete search history.

(56) References Cited

U.S. PATENT DOCUMENTS

| 10,310,113 B2* | 6/2019 | Sun ......................... G01V 1/303 |
| 2016/0025878 A1* | 1/2016 | Shin ....................... G01V 1/282 |
| | | 367/7 |

(Continued)

FOREIGN PATENT DOCUMENTS

| CN | 111505713 A | 8/2020 |
| CN | 111538080 A | 8/2020 |

(Continued)

*Primary Examiner* — Krystine E Breier
(74) *Attorney, Agent, or Firm* — Nitin Kaushik (57) ABSTRACT

The present disclosure belongs to the technical field of seismic exploration imaging, and relates to an interpretive-guided velocity modeling seismic imaging method and system, a medium and a device. The method comprises the following steps: S1. performing first imaging on a given initial velocity model to obtain a first imaging result; S2. performing relative wave impedance inversion on the first imaging result to obtain a relative wave impedance profile; S3. performing Curvelet filtering on the relative wave impedance profile to obtain a first interpretation scheme; S4. superposing the first interpretation scheme and the initial velocity model to obtain a new migration velocity field; S5. performing second imaging on a new migration velocity field to obtain a second imaging result; and S6. repeating steps S2-S4 for the obtained second imaging result until a final seismic imaging result is obtained.

9 Claims, 9 Drawing Sheets

(56) References Cited

U.S. PATENT DOCUMENTS

| | | | | |
|---|---|---|---|---|
| 2016/0131781 A1* | 5/2016 | Sun | ............... | G01V 1/282 |
| | | | | 367/7 |
| 2018/0045839 A1* | 2/2018 | Tang | ............... | G06F 30/00 |
| 2020/0183031 A1* | 6/2020 | Denli | ............... | G01V 1/301 |
| 2021/0026028 A1* | 1/2021 | Thorne | ............... | G01V 1/306 |

FOREIGN PATENT DOCUMENTS

| | | |
|---|---|---|
| CN | 112230283 A | 1/2021 |
| CN | 114428324 A | 5/2022 |

\* cited by examiner

INTERPRETIVE-GUIDED VELOCITY MODELING SEISMIC IMAGING METHOD AND SYSTEM, MEDIUM AND DEVICE

CROSS-REFERENCE TO RELATED APPLICATIONS

The application claims priority to Chinese patent application No. 2021111497944, filed on Sep. 29, 2021, the entire contents of which are incorporated herein by reference.

TECHNICAL FIELD

The present disclosure relates to an interpretive-guided velocity modeling seismic imaging method and system, a medium and a device, belongs to the technical field of seismic exploration, and particularly belongs to the technical field of seismic exploration imaging.

BACKGROUND

Velocity modeling, seismic migration, and seismic inversion are three traditional technical fields in exploration seismology. Conventional velocity modeling includes migration velocity analysis such as Normal Move Out (NMO) stack, pre-stack time migration, time-depth conversion and pre-stack depth migration. As conventional velocity modeling only uses travel time information, the average effect is very strong, and an established velocity field is very smooth, conventional velocity modeling is not suitable for migration imaging of high-frequency seismic data. At present, an imaging profile obtained by adopting the most advanced least-square reverse time depth migration based on such smooth velocity field seismic migration contains less structural details.

SUMMARY

In view of the above-mentioned problems, the purpose of the present disclosure is to provide an interpretive-guided velocity modeling seismic imaging method and system, a medium, and a device. According to the present disclosure, proceeding from an initial velocity model, the interpretive-guided velocity modeling of a geological structure is performed through high-precision migration imaging and subsequent data processing of a protruding structure, and then migration imaging is performed, so that an imaging profile contains more structural details, and thus seismic interpreters can get richer geological characteristics on the imaging profile.

In order to achieve the above purpose, the present disclosure adopts the following technical scheme: an interpretive-guided velocity modeling seismic imaging method, comprising: S1 performing first imaging on a given initial velocity model to obtain a first imaging result; S2 performing relative wave impedance inversion on the first imaging result to obtain a relative wave impedance profile; S3 performing Curvelet filtering on the relative wave impedance profile to obtain a first interpretation scheme; S4 superposing the first interpretation scheme and the initial velocity model to obtain a new migration velocity field; S5 performing second imaging on the new migration velocity field to obtain a second imaging result; and S6 repeating the steps of relative wave impedance inversion and Curvelet filtering for the obtained second imaging result until a final seismic imaging result is obtained.

Further, the first imaging and the second imaging are obtained by inputting the given initial velocity model or the new migration velocity field into a least-square inverse-time migration algorithm.

Further, the relative wave impedance inversion is directly performed based on a deconvolution method.

Further, the relative wave impedance is calculated on the relative wave impedance profile by the relative wave impedance inversion method, and standard impedance is obtained by migration velocity analysis, and is normalized and calibrated to obtain a relative velocity profile.

Further, the similarity between the imaging result obtained each time and an imaging result of a real fault-karst model is calculated to verify an imaging result of each interpretive-guided velocity modeling.

Further, the given velocity model is obtained by conventional velocity modeling, the sizes and number of horizontal and vertical grids of the initial velocity model are given, and shot gather records based on the initial velocity model are obtained by a finite difference method.

Further, the initial velocity model comprises the following model parameters: sizes of the horizontal and vertical grids, spacing of the horizontal and vertical grids, wavelet duration and main frequency, time sampling interval, total time length, number of seismic sources, spacing between the seismic sources and starting positions of horizontal and vertical coordinates of the seismic sources.

The present disclosure further comprises an interpretive-guided velocity modeling seismic imaging system, comprising: a primary imaging module configured for performing first imaging on the given initial velocity model to obtain a first imaging result; a relative wave impedance inversion module configured for performing relative wave impedance inversion on the first imaging result to obtain a relative wave impedance profile; an interpretation module configured for performing Curvelet filtering on the relative wave impedance profile to obtain a first interpretation scheme; a superposing module configured for superposing the first interpretation scheme and the initial velocity model to obtain the new migration velocity field; a second imaging module configured for performing second imaging on the new migration velocity field to obtain a second imaging result; and a circulation module configured for inputting the obtained second imaging result into the relative wave impedance inversion module and the interpretation module for circulation until the final seismic imaging result is obtained.

The present disclosure further comprises an interpretive-guided velocity modeling seismic imaging system and a computer-readable storage medium storing one or more programs; the one or more programs comprise instructions; and when the instructions are executed by a computing device, the computing device executes the interpretive-guided velocity modeling seismic imaging method according to any of the above.

The present disclosure further provides the computing device, which comprises one or more processors, a memory, and one or more programs, wherein the one or more programs are stored in the memory, configured to be executed by the one or more processors, and used for executing the interpretive-guided velocity modeling seismic imaging method according to any one of the above.

Due to the adoption of the above technical scheme, the present disclosure has the following advantages:

1. imaging is performed updating a velocity model, an obtained result is closer to a seismic imaging result of a real velocity model, detailed structures not shown in a first imaging profile are added, and the structure of an imaging profile is more convergent, which effectively guides the subsequent seismic interpretation work and has great significance for exploration and development of oil and gas.

2. velocity modeling, seismic migration, and seismic inversion are three traditional technical fields of exploration seismology. Generally speaking. Velocity modeling is directly related to seismic migration, and provides an initial velocity field for seismic migration; and velocity modeling is directly related to seismic inversion, and provides low-frequency information for seismic inversion. In practical application, there is no direct connection between seismic migration and seismic inversion. The present disclosure establishes the connection between seismic migration and seismic inversion and can be widely applied to the field of seismic migration imaging.

DETAILED DESCRIPTION OF THE EMBODIMENTS

Embodiment I

Figure 1:
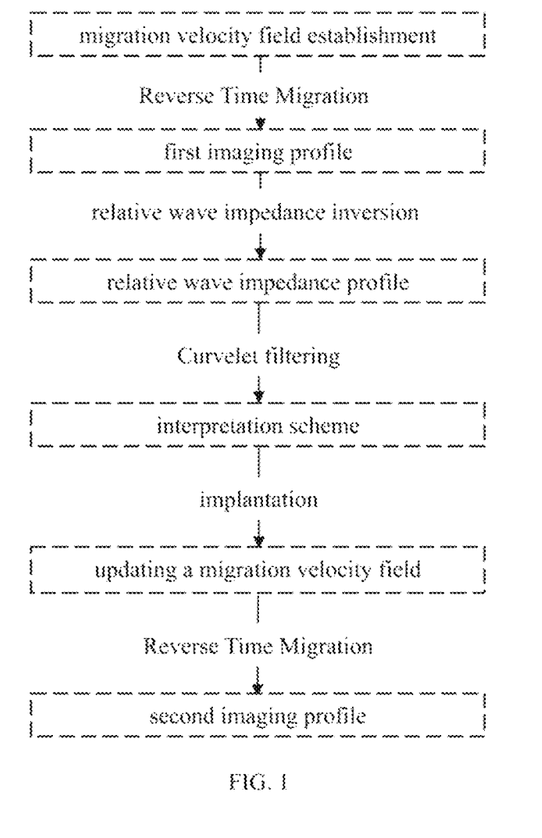
FIG. 1 is a flowchart of an interpretive-guided velocity modeling seismic imaging system in an embodiment of the present disclosure.
Figure 2:
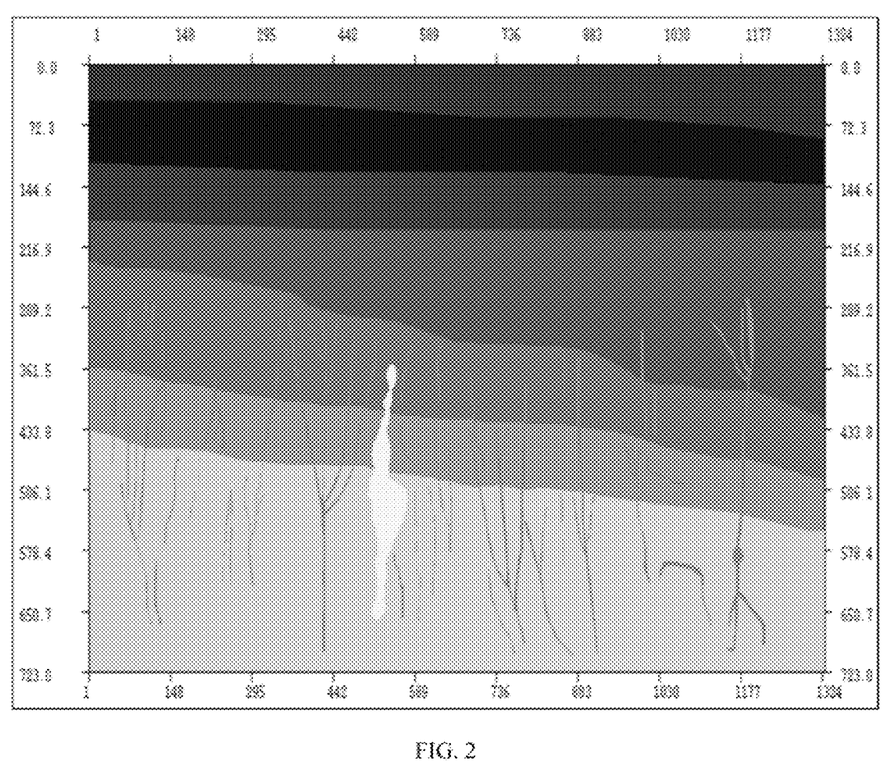
FIG. 2 is a real fault-karst velocity model in an embodiment of the present disclosure.
Figure 3:
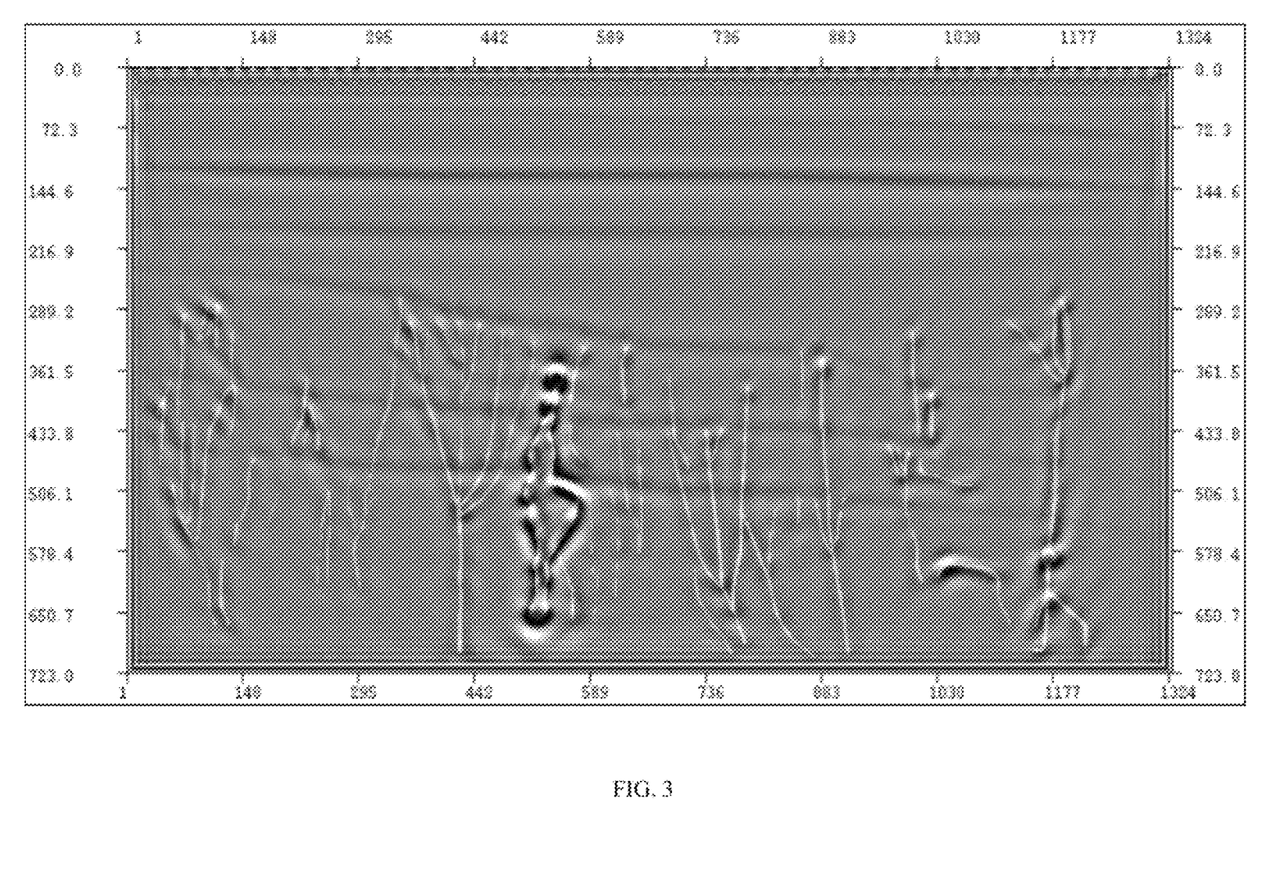
FIG. 3 is a least-square reverse time migration imaging profile of the real fault-karst velocity model in an embodiment of the present disclosure.
Figure 4:
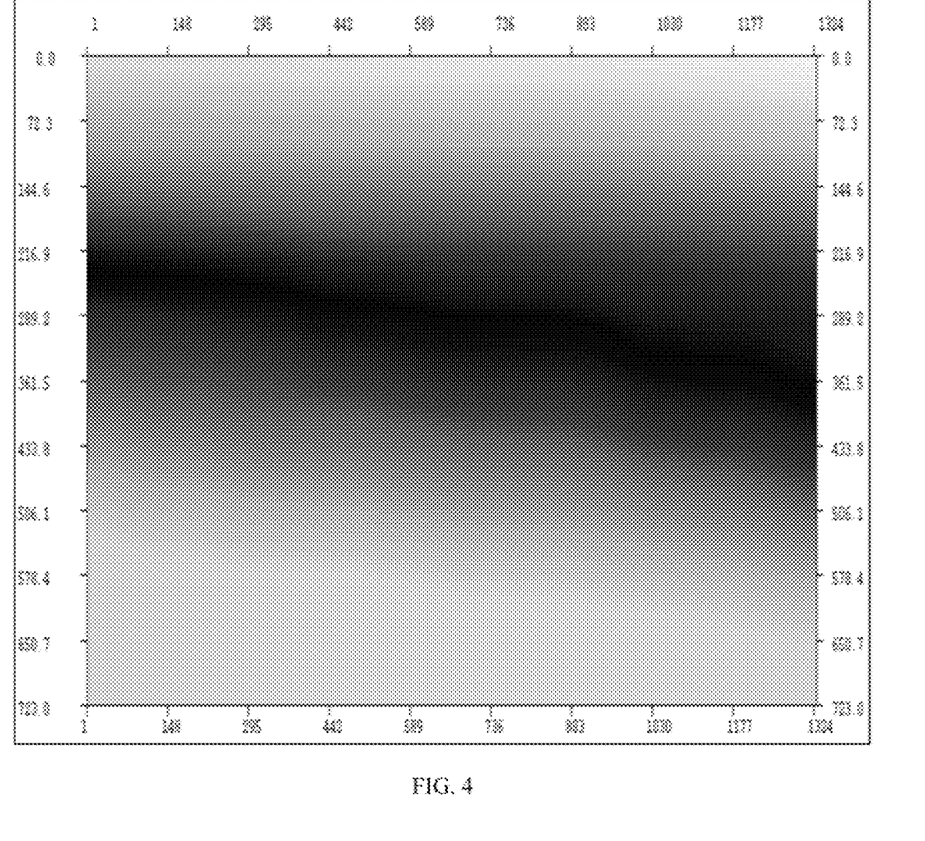
FIG. 4 is a migration velocity field of the real fault-karst velocity model in an embodiment of the present disclosure.

The present embodiment discloses an interpretive-guided velocity modeling seismic imaging method and is illustrated by taking a fault-karst velocity model as an example; and a real model image of the fault-karst velocity model is as shown in FIG. 2. Synthetic seismic shot gather data is generated based on the fault-karst velocity model, and a real velocity model migration imaging profile as shown in FIG. 3 is obtained by adopting the least-square reverse time migration (RTM—Reverse Time Migration) imaging. As shown in FIG. 1, the method comprises the following steps:

S1. performing first imaging on a given initial velocity model to obtain a first imaging result;

The given initial velocity model is as shown in FIG. 4 and is obtained by conventional velocity modeling, the sizes and number of horizontal and vertical grids of the initial velocity model are given, and shot-gather records based on the initial velocity model are obtained by a finite difference method.

The initial velocity model comprises the following model parameters: sizes of the horizontal and vertical grids, spacing of the horizontal and vertical grids, wavelet duration and main frequency, time sampling interval, total time length, number of seismic sources, spacing between the seismic sources and starting positions of horizontal and vertical coordinates of the seismic sources.

S2. performing relative wave impedance inversion on the first imaging result to obtain a relative wave impedance profile.

Figure 5:
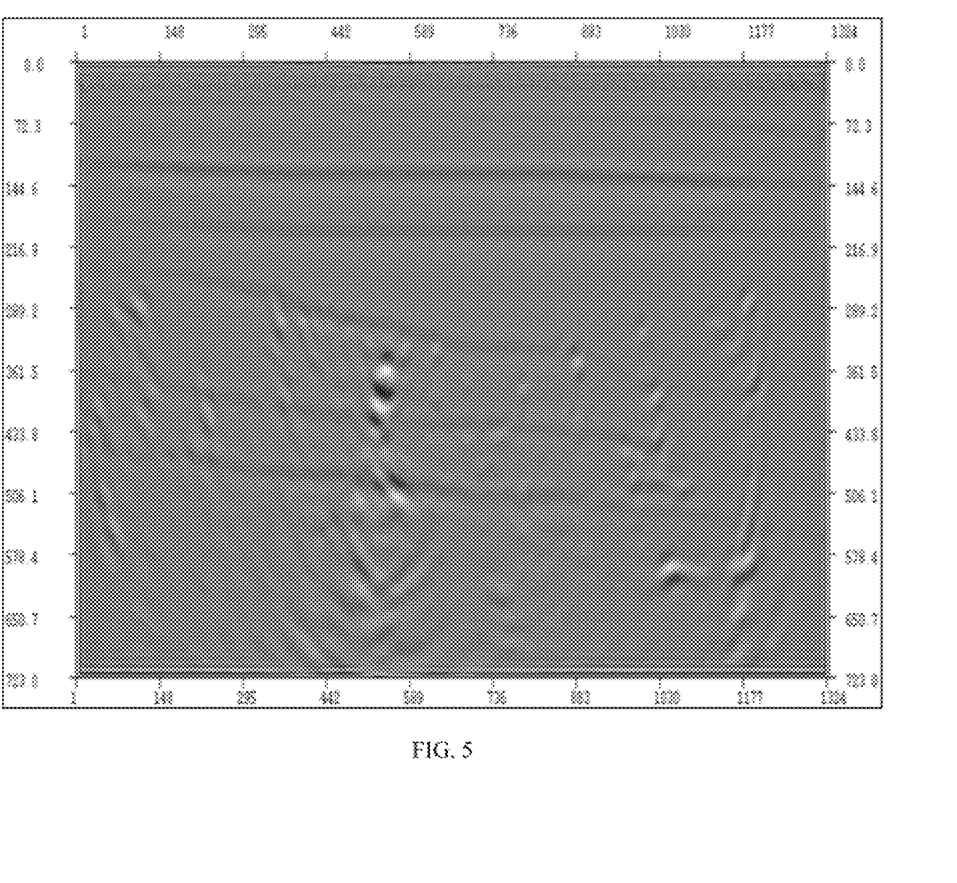
FIG. 5 is a first imaging result diagram of the migration velocity field of the real fault-karst velocity model in an embodiment of the present disclosure.

The initial velocity model is imaged by adopting a least-square inverse time migration method based on the parameters of the migration velocity model and the shot-gather data to obtain the first imaging result, and the first imaging result in the present embodiment is as shown in FIG. 5, wherein the parameters of the model are the same as those of the initial velocity model.

Figure 6:
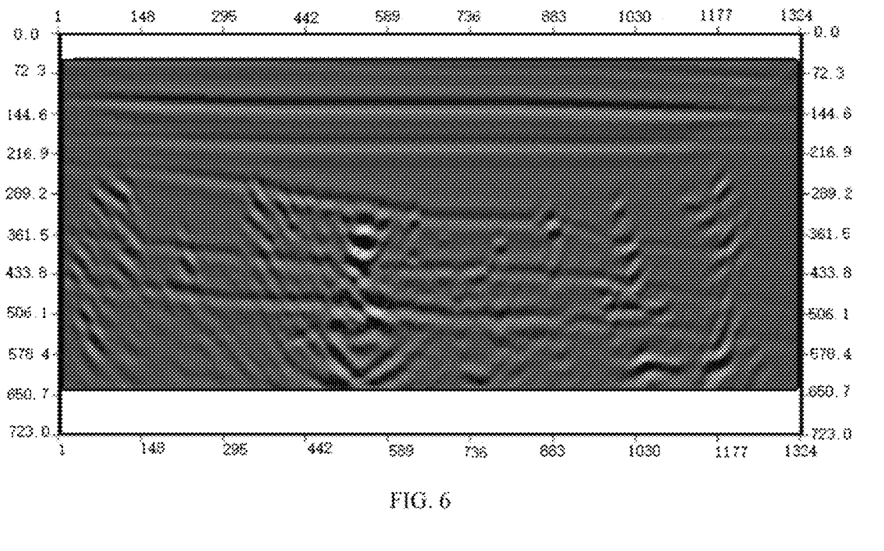
FIG. 6 is a relative wave impedance profile of the first imaging result diagram of the real fault-karst velocity model in an embodiment of the present disclosure.

Relative wave impedance inversion is directly performed based on a deconvolution method, which has the characteristics of simple calculation and being not restricted by geological data and well data. Specifically, the relative wave impedance is calculated on the relative wave impedance profile, the standard impedance is obtained by migration velocity analysis, and is normalized and calibrated to obtain a relative velocity profile, specifically as shown in FIG. 6, the relative wave impedance is obtained.

Figure 7:
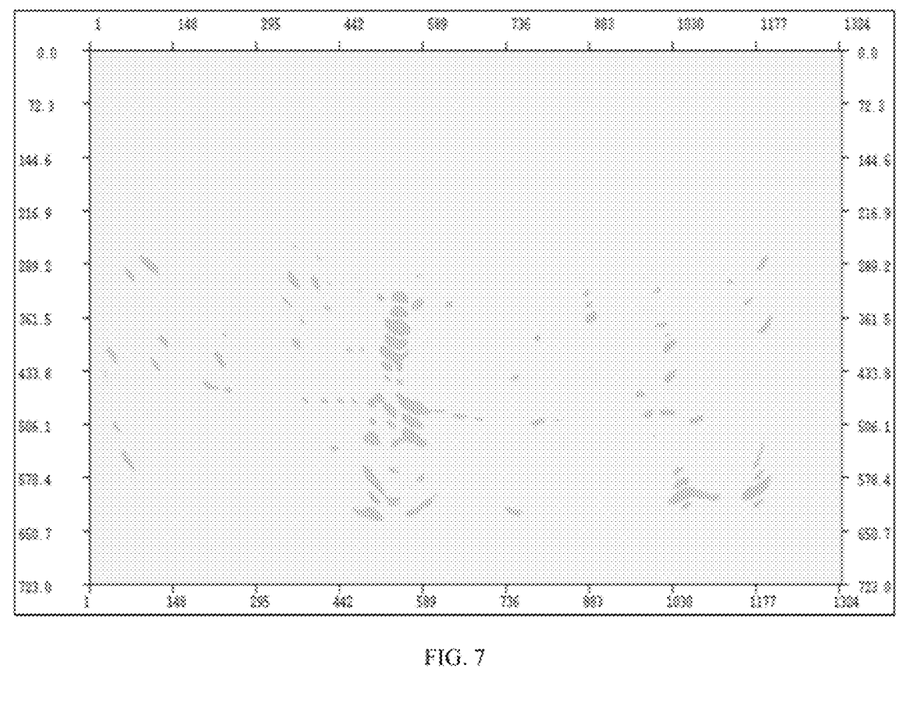
FIG. 7 is an interpretation scheme diagram based on the relative wave impedance profile of the real fault-karst velocity model in an embodiment of the present disclosure.

S3. performing Curvelet filtering on the relative wave impedance profile to highlight the geological structure and obtain a first interpretation scheme, the rest of which is as shown in FIG. 7.

Figure 8:
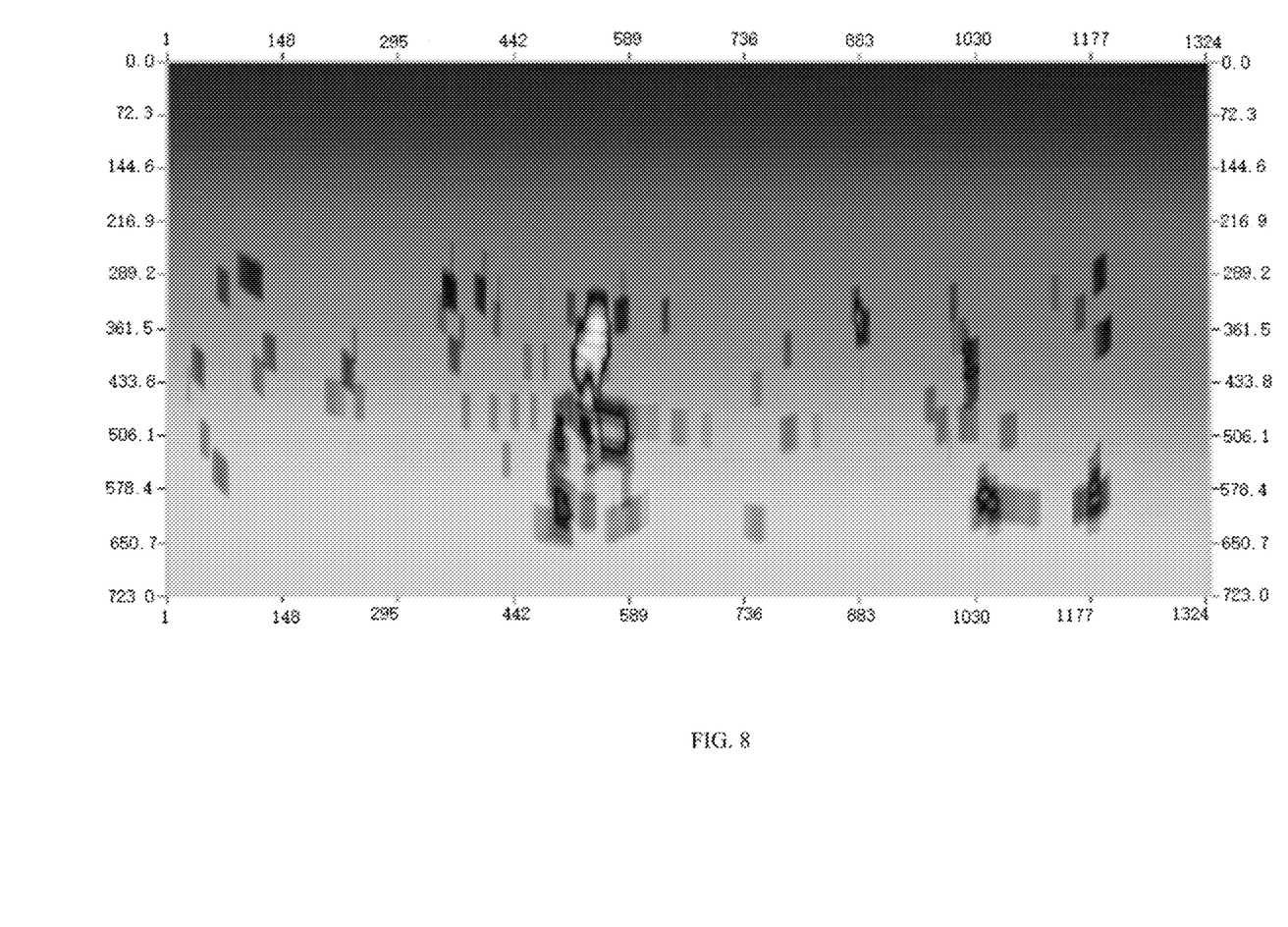
FIG. 8 is a superposition result of the interpretation scheme and the migration velocity field, and the updated image of the migration velocity field in an embodiment of the present disclosure.

S4. superposing the first interpretation scheme and the initial velocity model to obtain a new migration velocity field, as shown in FIG. 8.

Figure 9:
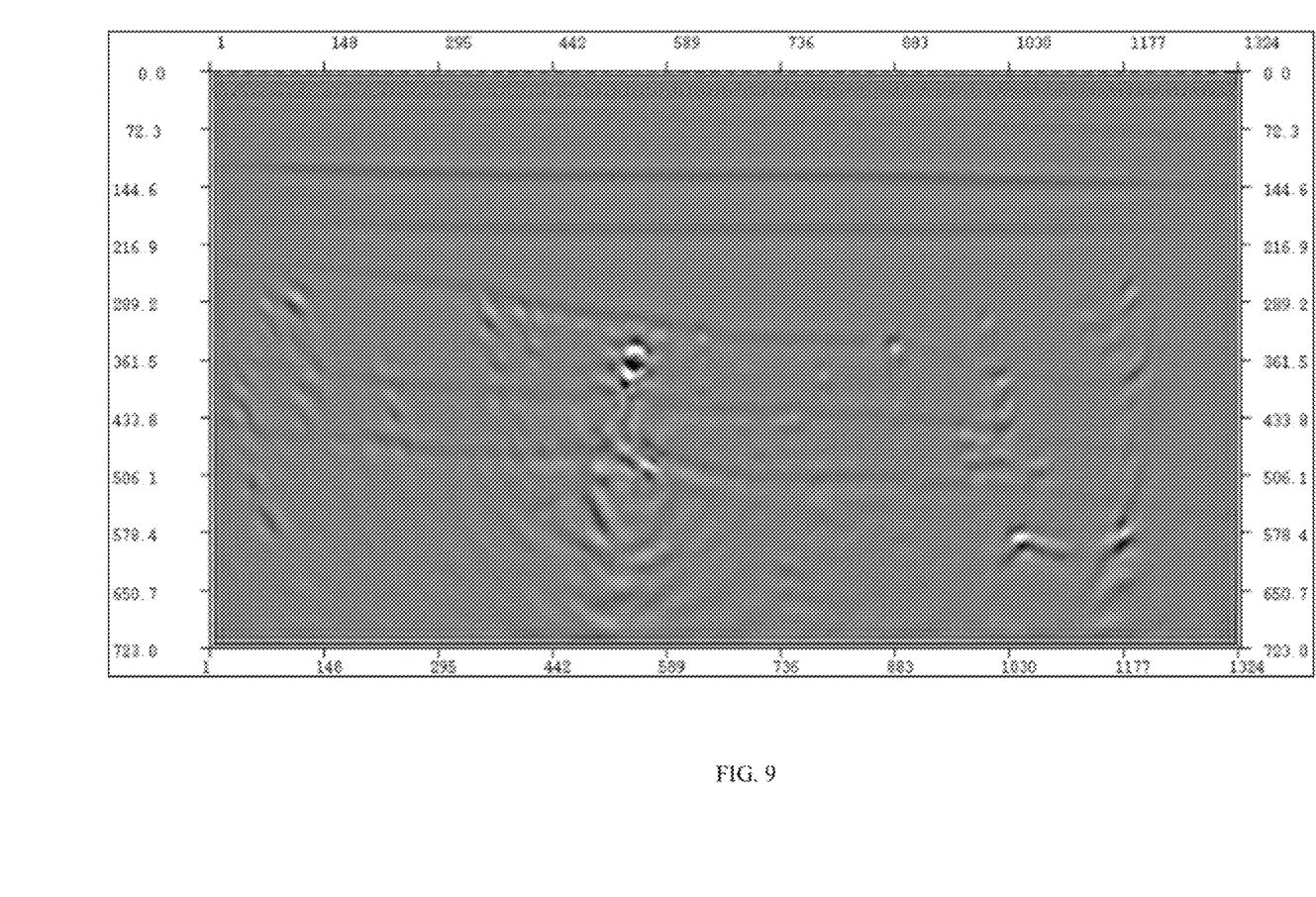
FIG. 9 is a second imaging result diagram in an embodiment of the present disclosure.

S5. performing second imaging on the new migration velocity field to obtain the second imaging result, as shown in FIG. 9.

The new migration velocity field is imaged by adopting the least-square reverse time migration method based on the parameters of the migration velocity model and the shot-gather data to obtain the second imaging result.

S6. repeating S2-S4 for the obtained second imaging result until the final seismic imaging result is obtained. Through such iteration, the seismic imaging profile gradually approaches the real geological structure.

The similarity between the imaging result obtained each time and the imaging result of the real fault-karst model is calculated to verify the imaging result of each interpretive-guided velocity modeling and judge the effectiveness of the present method. The similarities between the first imaging result and the imaging result of the real fault-karst model and between the second imaging result and the imaging result of the real fault-karst model (that is, a real velocity imaging profile obtained based on the image in FIG. 2, that is, FIG. 3) are respectively calculated. The greater the similarity, the better the effect of the interpretive-guided velocity modeling seismic imaging method is. The similarity between the first imaging profile and the real velocity imaging profile is 71.46%, and the similarity between the second imaging profile and the real velocity imaging profile is 81.28%. After two iterations, the imaging effect is improved by nearly 10%.

Embodiment II

Based on the same inventive concept, the present disclosure provides an interpretive-guided velocity modeling seismic imaging system, which comprises:

a primary imaging module configured for performing first imaging on the given initial velocity model to obtain the first imaging result;

a relative wave impedance inversion module configured for performing relative wave impedance inversion on the first imaging result to obtain the relative wave impedance profile;

an interpretation module configured the performing Curvelet filtering on the relative wave impedance profile to obtain the first interpretation scheme;

a superposing module configured for superposing the first interpretation scheme and the initial velocity model to obtain the new migration velocity field;

a second imaging module configured for performing second imaging on the new migration velocity field to obtain a second imaging result; and a circulation module configured for inputting the obtained second imaging result into the relative wave impedance inversion module and the interpretation module for circulation until the final seismic imagine result is obtained.

Embodiment III

Based on the same inventive concept, the present disclosure provides a computer-readable storage medium storing one or more programs, the one or more programs comprise instructions, and when the instructions are executed by a computing device, the computing device executes the interpretive-guided velocity modeling seismic imaging method of any one of the above.

Embodiment IV

Based on the same inventive concept, the present disclosure provides the computing device, comprising one or more processors, a memory, and one or more programs, wherein the one or more programs are stored in the memory and configured to be executed by the one or more processors, and the one or more programs are used for executing the interpretive-guided velocity modeling seismic imaging method according to any of the above.

What is claimed is:

1. An interpretive-guided velocity modeling seismic imaging method, comprising:
configuring a computing device having one or more processors and a memory, the memory storing program instructions executed by the one or more processors for:
performing first imaging on a given initial velocity model to obtain a first imaging result;
performing relative wave impedance inversion on the first imaging result to obtain a relative wave impedance profile;
performing Curvelet filtering on the relative wave impedance profile to obtain a first interpretation scheme;
superposing the first interpretation scheme and the given initial velocity model to obtain a new migration velocity field;
performing second imaging on the new migration velocity field to obtain a second imaging result; and
repeating the steps of relative wave impedance inversion and Curvelet filtering for the obtained second imaging result until a final seismic imaging result is obtained, the final seismic imaging result is a clear image of a real geological structure.

2. The interpretive-guided velocity modeling seismic imaging method of claim 1, wherein the first imaging and the second imaging are obtained by respectively inputting the given initial velocity model, and the new migration velocity field into a least-square inverse-time migration algorithm.

3. The interpretive-guided velocity modeling seismic imaging method of claim 1, wherein the relative wave impedance inversion is directly performed based on a deconvolution method.

4. The interpretive-guided velocity modeling seismic imaging method of claim 3, wherein a relative wave impedance is calculated on the relative wave impedance profile by the relative wave impedance inversion method, and a standard impedance is obtained by performing migration velocity analysis, the standard impedance is normalized and calibrated to obtain a relative velocity profile.

5. The interpretive-guided velocity modeling seismic imaging method of claim 1, wherein a similarity, between the second imaging result obtained each time and an imaging result of a real fault-karst model is calculated to verify whether or not, each of the obtained second imaging results is similar to an imaging result of each interpretive-guided velocity modeling.

6. The interpretive-guided velocity modeling seismic imaging method of claim 1, wherein the given initial velocity model is obtained by conventional velocity modeling, the sizes and number of horizontal and vertical grids of the initial velocity model are given, and shot gather records based on the initial velocity model are obtained by a finite difference method.

7. The interpretive-guided velocity modeling seismic imaging method of claim 6, wherein the initial velocity model comprises the following model parameters: sizes of the horizontal and vertical grids, spacing of the horizontal and vertical grids, wavelet duration and main frequency, time sampling interval, total time length, number of seismic sources, spacing between the seismic sources and starting positions of horizontal and vertical coordinates of the seismic sources.

8. An interpretive-guided velocity modeling seismic imaging system, comprising:
a primary imaging module configured for performing first imaging on a given initial velocity model to obtain a first imaging result;
a relative wave impedance inversion module configured for performing relative wave impedance inversion on the first imaging result to obtain a relative wave impedance profile;
an interpretation module configured for performing Curvelet filtering on the relative wave impedance profile to obtain a first interpretation scheme;
a superposing module configured for superposing the first interpretation scheme and the given initial velocity model to obtain the new migration velocity field;
a second imaging module configured for performing second imaging on the new migration velocity field to obtain a second imaging result; and
a circulation module configured for iteratively re-inputting the obtained second imaging result into the interpretation module to obtain a final seismic imaging result.

9. A computer-readable storage medium storing one or more programs, wherein the one or more programs comprise instructions, and when the instructions are executed by a computing device, the computing device executes the interpretive-guided velocity modeling seismic imaging method according to claim 1.

\* \* \* \* \*